Aug. 5, 1958 C. R. KEITH ET AL 2,846,505

AUTOMATIC TELEPHONE ANSWERING SYSTEM

Filed March 11, 1955 2 Sheets-Sheet 1

INVENTORS C.R. KEITH
C.A. NICKERSON
C.M. TARIS

BY V. P. Priolo

ATTORNEY

Aug. 5, 1958 C. R. KEITH ET AL 2,846,505

AUTOMATIC TELEPHONE ANSWERING SYSTEM

Filed March 11, 1955 2 Sheets-Sheet 2

INVENTORS C.R. KEITH
C.A. NICKERSON
C.M. TARIS

BY V. P. Priolo

ATTORNEY 2,846,505

AUTOMATIC TELEPHONE ANSWERING SYSTEM

Clyde R. Keith, Maplewood, Clifford A. Nickerson, Bernardsville, and Charles M. Taris, Cranford, N. J., assignors to Bell Telephone Laboratories, Incorporated, New York, N. Y., a corporation of New York Application March 11, 1955, Serial No. 493,722

8 Claims. (Cl. 179—6)

This invention relates to automatic telephone answering systems.

To obtain satisfactory results with an automatic answering system it is necessary that the time which normally elapses under ordinary telephone answering conditions, that is, the time which elapses before the called party responds to the calling party, be simulated. A suitable interval should be provided between the time the automatic answering device is energized by means responsive to the ring-up circuit and the time the line connected to the device is seized by and the recorded message is transmitted to the calling party, so that the calling party will have an opportunity to ready himself to receive the message. Experience has shown that an interval of the order of 3.5 seconds will provide satisfactory assurance that the calling party will not miss a portion of the message.

It is also desirable, when the line is seized by the calling party, that the control of the energization of the answering device be transferred to means responsive to a disconnect condition which may be established by said calling party. In this connection it is important that premature operation of said disconnect condition responsive means be prevented when the switch from ringing battery to talking battery takes place at the central office. Premature operation of said means can be voided by providing an interval of 1 to 1.5 seconds between the time the line is seized by the calling party and the time the control of the answering device is transferred to the disconnect condition responsive means.

Accordingly, it is an object of this invention to provide means for establishing a predetermined time interval between energization of the automatic telephone answering system and transmission of the recorded message to the calling party.

It is another object of this invention to provide means for establishing a predetermined time interval between seizure by the calling party of the line connected to the automatic telephone answering device and transfer of the control of the energization of said device to means responsive to a disconnect condition established by said calling party.

In a preferred embodiment of this invention the first objective is achieved by means of a first relay energized through an interlock switching system including a switch operable by the transducer carriage after traveling a predetermined distance, and a switch operable once per revolution of the record drum by a pin member affixed to said drum. The second objective is achieved by means of a second relay energized through the operated contacts of said first relay and a time constant network.

Figure 1:
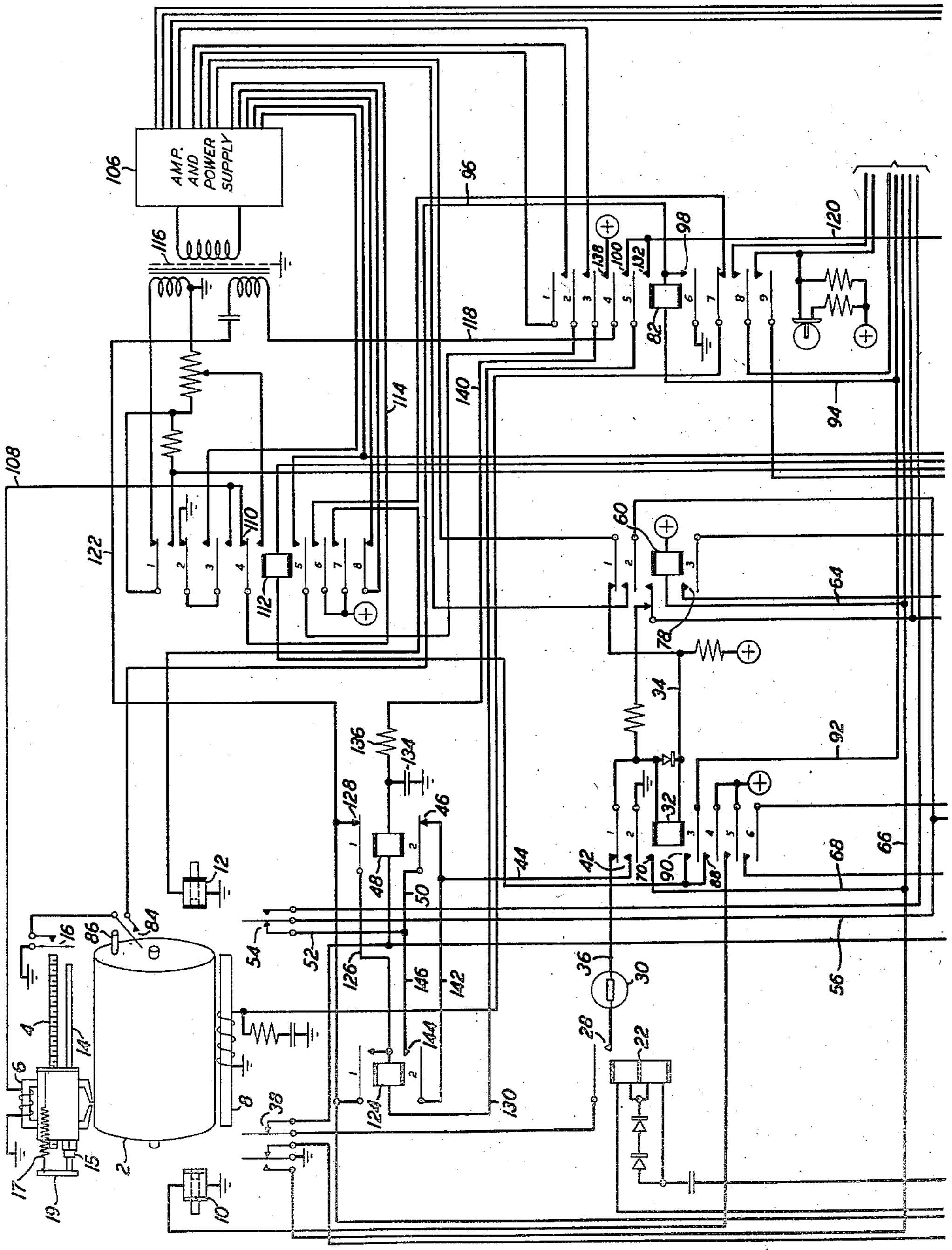
Figure 2:
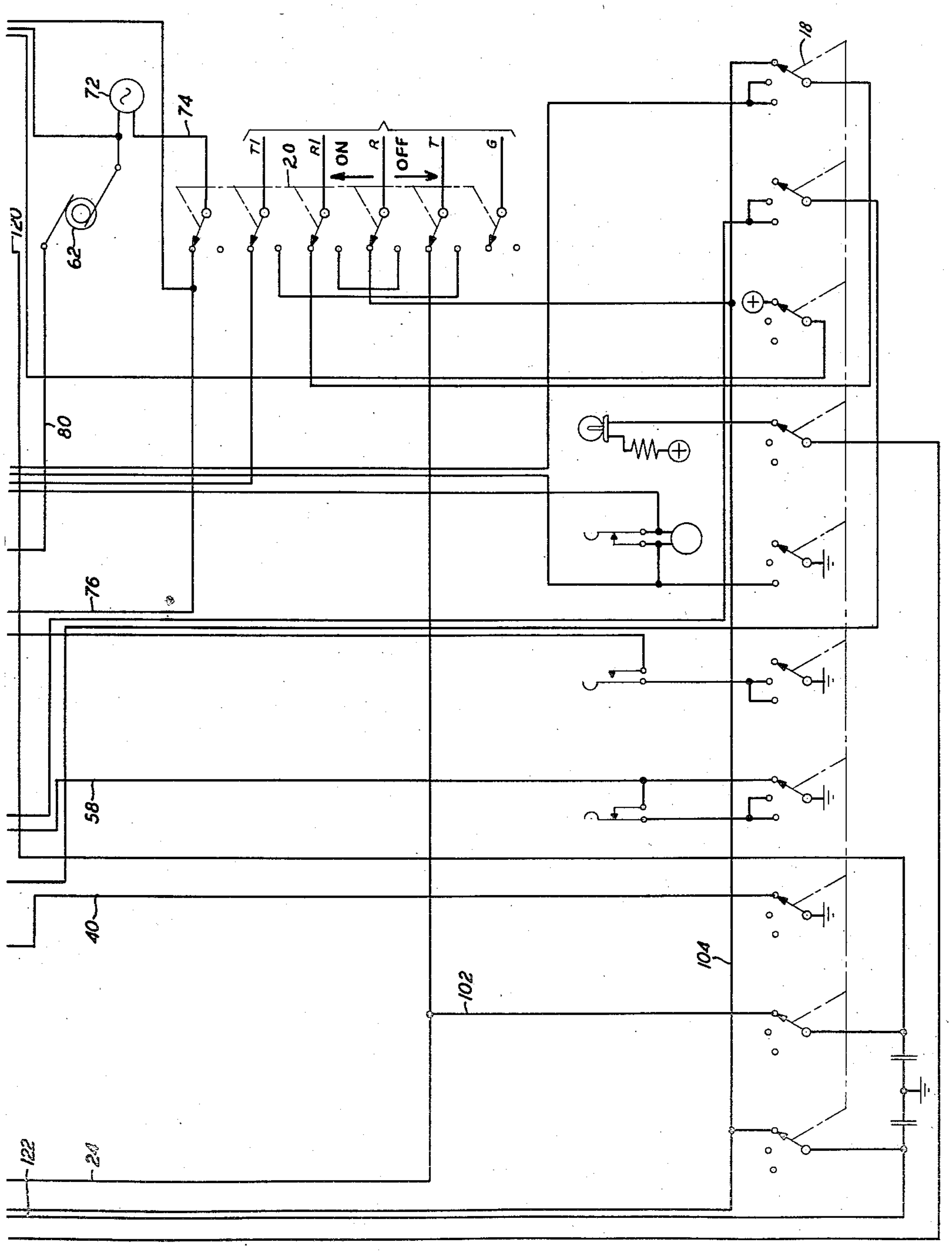

The invention itself, together with further objects and advantages thereof, will be more clearly understood from the following detailed description and the accompanying drawing in which:

Figs. 1 and 2 constitute a circuit schematic of a preferred embodiment of the invention.

Referring now to Figs. 1 and 2, the recording mechanism comprising the record drum 2, the feed screw 4, the record-reproduce magnetic head carriage 6, the erase magnet 8 and the solenoids 10 and 12 may be similar to the answering or talk-out mechanism disclosed in patent application Serial No. 331,157, filed by C. R. Keith and C. A. Nickerson on January 14, 1953, which has since matured into Patent 2,761,899, granted September 4, 1956, with the following exception. The carriage 6 has been modified in this invention to include rod 14 which is used to actuate switch 16 as described hereinafter.

The recording mechanism is used in the execution of three functions namely, recording the message, checking the message or announcement and (automatic answer) reproducing the message for transmission to the calling party. The present invention is directed primarily to the last of these three functions and the following detailed description will therefore be limited to that portion of the schematic shown in Figs. 1 and 2 which is pertinent thereto.

With the function switch 18 set in the automatic answer position and the on-off switch 20 in the on position, the relay 22 will respond to ringing current provided, when the calling party calls the station in which the recording mechanism is located, through the tip and ring terminals T and R and over conductors 24 and 104. As disclosed in application Serial No. 441,999, filed by E. G. Spack on July 8, 1954, which has since matured into Patent 2,802,059, granted August 6, 1957, contact 28 of relay 22 will close intermittently as long as ringing current is applied and, after the resistance of thermistor 30 decreases sufficiently, relay 32 will be operated by current supplied over the path which includes conductors 34 and 36, switch 38, and conductor 40. On operating, relay 32 locks itself up over the path including conductor 34, relay contact 42, conductor 44, contact 46 of relay 48, conductors 50 and 52, switch 54 and conductors 56 and 58.

The operation of relay 32 causes the operation of the drum pawl solenoid 10 (as disclosed in patent application Serial No. 331,157 referred to above) thereby permitting the drum 2 to rotate, and the operation of relay 60 which controls the operation of the drum motor 62. Relay 60 is operated by current supplied over the path which includes conductors 64, 66 and 68, and contact 70 of relay 32. The motor 62 is operated by current from source 72 supplied over the path which includes conductor 74, switch 20, conductor 76, contact 78 of relay 60 and conductor 80.

The operation of relay 32 also presets relay 82 for subsequent operation by switches 84 and 16. Switch 84 is a pulsating contact switch which is operated by a pin 86 associated with recording drum 2. The first operation of switch 84 occurs about 0.8 second after the start of drum rotation. Succeeding operations of switch 84 occur once per revolution of drum 2, or about 2.67 seconds apart. Switch 16 is operated by rod 14 which is slidably mounted on head carriage 6. Its purpose is to prevent switch 84 from operating relay 82 until the second closure of switch 84 takes place. Switch 16 closes after about 1.5 seconds of drum rotation and remains closed thereafter until the head carriage 6 flies back to zero position at the termination of the announcement and the operation of switch 54, or after a calling party disconnect condition is established as will be described hereinafter.

The effective length of rod 14 is determined by lock nut 15 which is held against the surface of carriage 6 by means of spring member 17, one end of said spring member being attached to said carriage, the other end being attached to said rod by means of the connecting member 19. After switch 16 is closed rod 14 will remain in fixed position while carriage 6 continues to move forward. When carriage 6 flies back to zero position, spring member 17 will return rod 14 to its initial position.

As the second operation of switch 84 occurs, approximately 3.5 seconds after the operation of relays 32 and 60 and the start of rotation of drum 2, relay 82 operates. Current is supplied to the winding of relay 82 over the path which includes contacts 88 and 90 of relay 32, conductors 92, 94 and 96 and switches 84 and 16. On operating, relay 82 locks itself up over the path which includes its own contact 98, conductors 94 and 92 and relay contacts 90 and 88.

The operation of relay 82 closes contact 100 and thereby permits the transmission of the announcement to the calling party over conductors 102 and 104 which are connected to the tip and ring terminals T and R. The announcement is fed to the input of amplifier 106 over the path which includes conductor 108, contact 110 of relay 112 and conductor 114. It is then fed to the tip terminal T from the secondary of output transformer 116 over the path which includes conductor 118, relay contact 100, conductor 120, function switch 18 and conductor 102, and to the ring terminal R over the path which includes conductor 122, function switch 18 and conductor 104.

The operation of relay 82 also connects the winding of relay 124 to the tip and ring terminals, one side of the winding being connected over the path which includes conductor 126, contact 128 of relay 48, conductor 122, function switch 18 and conductor 104; the other side of the winding being connected over the path which includes conductor 130, contact 132 of relay 82, conductor 120, function switch 18 and conductor 102.

As soon as the telephone line is bridged by the winding of relay 124, a direct-current path is completed in accordance with conventional telephone practice and the ring tripping relay in the central office operates, cutting off ringing current and transferring the tip and ring conductors from ringing battery to talking battery. The ringing current responsive relay 22 is thereby deenergized. As long as the calling party does not establish a disconnect condition (does not hang up) relay 124 will remain energized since its winding is included in the called line loop circuit which will remain closed as long as the calling party's telephone hook switch remains closed.

On operating, relay 82 also starts the charging of condenser 134 through resistor 136. Approximately 1.5 seconds after the operation of relay 82, relay 48 operates, current being supplied to its winding over the path which includes contact 138 of relay 82 and conductors 140 and 40.

The operation of relay 48 transfers the control of relay 32 to relay 124 which will be responsive to a disconnect condition established by the calling party. The transfer of control is achieved by opening contact 46 of relay 48 and holding relay 32 locked up over the path which includes conductor 34, relay contact 42, conductors 44 and 142, closed contact 144 of relay 124, conductors 146 and 52, switch 54 and conductors 56 and 58. It will be understood that a disconnect condition established by the calling party will deenergize relay 124 which, in turn, will cause the release of relay 32 and the deenergization of the answering system.

The time (1.5 seconds) which elapses before control of relay 32 is released by relay 48 provides assurance that the entire system will not be prematurely deenergized if relay 124 is momentarily deenergized when the tip and ring conductors are transferred from ringing battery to talking battery at the central office.

During the transmission of the announcement, switch 38 (operated by the drum pawl controlled by solenoid 10) remains open. An incoming call cannot restart the machine until this switch closes and the drum has indexed.

The announcement transmission function of automatic answer will be terminated either by the disconnecting of the calling party and the release of relay 124, or by the opening of switch 54 at the end of the announcement.

It is to be understood that the above-described arrangements are illustrative of the application of the principles of the invention. Other arrangements may be devised by those skilled in the art without departing from the spirit and scope of the invention.

What is claimed is:

1. In an automatic telephone answering system comprising a telephone line, a rotatable message bearing record support, a transducer and a carriage therefor, means for driving said support and providing said carriage with motion relative to said support, a ring-up circuit associated with said telephone line, said driving means being energized by means responsive to and operated by said ring-up circuit, switch means adapted to be actuated by means associated with said record support and carriage after a predetermined time interval, means responsive to a disconnect condition when established by a calling party, means operable when said switch means is actuated to connect said calling party disconnect responsive means to said telephone line, first means for holding said ring-up circuit responsive means in the operated condition, second means for holding said ring-up circuit responsive means in the operated condition, said second means including said calling party disconnect responsive means, means operable a predetermined time interval after said switch means is actuated to disable said first holding means, said second holding means retaining control until said calling party disconnect responsive means responds to a disconnect condition.

2. An automatic telephone answering system in accordance with claim 1 wherein a magnetizable message bearing record is mounted on said support and said transducer is a magnetic recording-reproducing head.

3. In an automatic telephone answering system comprising a telephone line, a rotatable message bearing record support, a transducer and a carriage therefor, means for driving said support and providing said carriage with motion relative to said support, a ring-up circuit associated with said telephone line, said driving means being energized by means responsive to and operated by said ring-up circuit, switch means adapted to be actuated after a predetermined time interval, said switch means comprising an interlock arrangement including a pulsating contact switch operable by said record support, the first operation of said switch occurring after a predetermined time interval, the succeeding operations occurring at intervals measured by the revolutions of said support, and a nonpulsating contact switch operable by said carriage prior to a predetermined one of said succeeding operations of said pulsating contact switch, means responsive to a disconnect condition when established by a calling party means operable when said switch means is actuated to connect said calling party disconnect responsive means to said telephone line, first means for holding said ring-up circuit responsive means in the operated condition, second means for holding said ring-up circuit responsive means in the operated condition, said second means including said calling party disconnect responsive means, means operable a predetermined time interval after said switch means is actuated to disable said first holding means, said second holding means retaining control until said calling party disconnect responsive means responds to a disconnect condition.

4. An automatic telephone answering system in accordance with claim 3 wherein a magnetizable message bearing record is mounted on said support and said transducer is a magnetic recording-reproducing head.

5. In an automatic telephone answering system comprising a telephone line, a rotatable message bearing record support, a transducer and a carriage therefor, means for driving said support and providing said carriage with motion relative to said support, a ring-up circuit associated with said telephone line, said driving means being energized by means responsive to and operated by said ring-up circuit, switch means adapted to be actuated by means associated with said record support and carriage after a predetermined time interval, means responsive to a disconnect condition when established by a calling party, means comprising a first relay operable when said switch means is actuated to connect said calling party disconnect responsive means to said telephone line, first means including a second relay for holding said ring-up circuit responsive means in the operated condition, second means for holding said ring-up circuit responsive means in the operated condition, said second means including said calling party disconnect responsive means, means including said first relay for energizing said second relay through a time constant network to disable said first holding means a predetermined time interval after said switch means is actuated, said second holding means retaining control until said calling party disconnect responsive means responds to a disconnect condition.

6. An automatic telephone answering system in accordance with claim 5 therein a magnetizable message bearing record is mounted on said support and said transducer is a magnetic recording-reproducing head.

7. In an automatic telephone answering system comprising a telephone line, a rotatable message bearing recording support, a transducer and a carriage therefor, means for driving said support and providing said carriage with motion relative to said support, a ring-up circuit associated with said telephone line, said driving means being energized by means responsive to and operated by said ring-up circuit, switch means adapted to be actuated after a predetermined time interval, said switch means comprising an interlock arrangement including a pulsating contact switch operable by said record support, the first operation of said switch occurring after a predetermined time interval, the succeeding operations of said switch occurring at intervals measured by the revolutions of said support, and a nonpulsating contact switch operable by said carriage prior to a predetermined one of said succeeding operations of said pulsating contact switch, means responsive to a disconnect condition when established by a calling party, means comprising a first relay operable when said switch means is actuated to connect said calling party disconnect responsive means to said telephone line, first means including a second relay for holding said ring-up circuit responsive means in the operated condition, second means for holding said ring-up circuit responsive means in the operated condition, said second means including said calling party disconnect responsive means, means including said first relay for energizing said second relay through a time constant network to disable said first holding means a predetermined time interval after said switch means is actuated, said second holding means retaining control until said calling party disconnect responsive means responds to a disconnect condition.

8. An automatic telephone answering system in accordance with claim 7 wherein a magnetizable message bearing record is mounted on said support and said transducer is a magnetic recording-reproducing head.

References Cited in the file of this patent

UNITED STATES PATENTS

| | | |
|---|---|---|
| 2,673,241 | Van Deventer | Mar. 23, 1954 |
| 2,673,242 | Van Deventer | Mar. 23, 1954 |
| 2,724,015 | Van Deventer | Nov. 15, 1955 |